(12) United States Patent
Obata et al.

(10) Patent No.: US 6,387,549 B1
(45) Date of Patent: May 14, 2002

(54) MAGNETIC SENSOR

(75) Inventors: Takeshi Obata; Takashi Manako; Yuichi Shimakawa, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/342,188

(22) Filed: Jun. 29, 1999

(30) Foreign Application Priority Data

Jun. 30, 1998 (JP) .......................................... 10-185033

(51) Int. Cl.[7] .................................................. G11B 5/66
(52) U.S. Cl. ............... 428/692; 428/694 R; 428/694 T; 428/694 TM; 428/694 TS; 428/900; 257/421; 257/422; 360/113; 360/126; 324/252; 324/246; 324/249
(58) Field of Search .............................. 478/692, 694 R, 478/694 T, 694 TM, 694 TS, 900; 257/421, 472; 360/113, 126; 324/252, 246, 249

(56) References Cited

U.S. PATENT DOCUMENTS 5,432,373 A * 7/1995 Johnson ...................... 257/421

FOREIGN PATENT DOCUMENTS

| JP | 6-237022 | 8/1994 |
| JP | 9-214018 | 8/1997 |
| JP | 10-12945 | 1/1998 |

* cited by examiner

Primary Examiner—Leszek Kiliman
(74) Attorney, Agent, or Firm—Young & Thompson

(57) ABSTRACT

A high-sensitivity magnetic sensor capable of detecting a nonequilibrium spin, uses an almost-spin-polarized ferromagnetic oxide in a high-quality trilayer arrangement including an intermediate layer made of a conductive nonmagnetic oxide not reacting with a ferromagnetic metallic oxide and having a lattice matching between a spin injection layer and a spin detection layer.

20 Claims, 4 Drawing Sheets

MAGNETIC SENSOR

BACKGROUND OF THE INVENTION

1. Field of the Invention

The present invention relates to a magnetic sensor, particularly to a high-sensitivity magnetic sensor used for a high-density magnetic recording/reading head.

2. Description of the Prior Art

It has been recently requested to further improve the recording density of an external memory such as a hard disk. Thereby, it is requested for a magnetic head for reading information from a recording medium to accurately detect a weaker external magnetic field.

The so-called MR device using metals or alloys has been used for a reading magnetic head.

However, a conventional MR device has problems that resistance change is too small for an external magnetic field and no sufficient output can be obtained from a weak external magnetic field. Therefore, the MR device cannot correspond to magnetic recording at a very-high recording density of, for example, $10Gb/in^2$ or more.

Therefore, to solve the above problems, a magnetic sensor for detecting a nonequilibrium spin injected into a paramagnetic metallic layer from a spin-polarized ferromagnetic material oxide is proposed (official gazette of Japanese Patent Application Laid-Open No. 9-214018).

The magnetic sensor disclosed in the official gazette of Japanese Patent Application Laid-Open No. 9-214018 is characterized by connecting a spin injection layer and a spin detection layer respectively made of an almost-completely-spin-polarized ferromagnetic material oxide each other by an intermediate layer made of a paramagnetic metal.

BRIEF SUMMARY OF THE INVENTION

Object of the Invention

However, the above structure is troublesome because it is necessary to form a submicron-order narrow portion between the spin injection layer and the spin detection layer and moreover, accurately adjust the position of the intermediate layer having a size of micron m or shorter order to the narrow portion between the spin injection layer and spin detection layer.

Moreover, because there are restrictions on the working accuracy by photolithography and etching, it takes a lot of time and it is very difficult to accurately cut the narrow portion, accurately adjust the position of the intermediate layer, and decrease the planar dimension of the intermediate layer to less than micron order. Thereby, a trouble occurs that the production efficiency is extremely lowered.

Furthermore, when the planar dimension of the intermediate layer is several-micron order or more, spin-polarized carriers injected into the intermediate layer from the spin injection layer must move several microns or more in the intermediate layer as for the above structure.

Moreover, as for the above distance, a spin flip occurs during moving and information is lost. Therefore, the difference between the effective numbers of electrons in an up-spin band and a down-spin band decreases when the magnetization directions of the spin injection layer and the spin detection layer are not parallel each other and as a result, the above conventional example causes a trouble that an output voltage lowers.

Furthermore, the above conventional example has the following problem on the material.

That is, when the intermediate layer is made of a non-magnetic single element such as Au or a nonmagnetic alloy such as Au—Ge, it is difficult to form a high-quality trilayer having less defects with an almost-completely-spin-polarized ferromagnetic metallic oxide such as $(La,Sr)MnO_3$.

To form a superior film with an almost-completely-spin-polarized ferromagnetic metal, a high temperature of 600 degrees centigrade or above is necessary when using, for example, $(La,Sr)MnO_3$. Thus, an intermediate layer made of a nonmagnetic element such as Au having a small adhesive strength with an oxide and a low melting point or a nonmagnetic alloy such as Au—Ge has a problem that the layer causes an interface reaction with $(La,Sr)MnO_3$ or cohesion by itself, a reaction layer is consequently formed on an interface, or a grain boundary occurs on the intermediate layer or a spin detection layer (or spin injection layer) formed on the intermediate layer.

In the above case, when the intermediate layer cohesion like an island at a high temperature, it is impossible to uniformly hold the intermediate layer with an almost-completely-spin-polarized ferromagnetic oxide such as $(La,Sr)MnO_3$ and thereby, separation or crack occurs on the interface between the intermediate layer and a spin injection layer (or spin detection layer).

When a trilayer is not high-quality, a reaction layer is present on the interface between an intermediate layer and a spin injection layer (or spin detection layer), or a grain boundary is present in the intermediate layer or spin injection layer (or spin detection layer), spin of carriers flips at the place, and the difference between the numbers of electrons of an up-spin band and a down-spin band effectively decreases in the intermediate layer and an output voltage lowers. This is not preferable for the performance of a device and simultaneously, a disadvantage occurs that the productivity of devices lowers.

Moreover, there is another problem that an output voltage lowers when an intermediate layer into which spin-polarized carriers are injected is made of a nonmagnetic single element such as Au or an alloy such as Au—Ge having a small resistivity.

This is because a nonmagnetic metal having a small resistivity such as Au has a large paramagnetic susceptibility and a large state density nearby a Fermi plane, the effective chemical potential difference between up-spin carrier and down-spin carrier due to nonequilibrium magnetization produced in an intermediate layer caused by the difference between the numbers of electrons in a up-spin band and a down-spin band decreases and an output voltage lowers. This is not preferable for the performance of a device.

SUMMARY OF THE INVENTION

It is an object of the present invention to provide a magnetic sensor having a device structure capable of improving the disadvantages of the above conventional example, particularly raising an output voltage, and improving the productivity.

A magnetic sensor of the present invention uses a basic structure in which a spin injection layer and a spin detection layer respectively made of an almost-completely-spin-polarized oxide ferromagnetic material are formed and a layer made of a nonmagnetic conductive oxide is held between the two layers as an intermediate layer.

In this case, the almost-completely(highly)-spin-polarized oxide ferromagnetic material constituting the spin injection layer and spin detection layer uses at least one of the perovskite-structure oxide $Ln_{1-x}A_xMnO_3$ (Ln denotes at least one of the elements such as lanthanoid, Bi, and Y, A denotes at least one of alkali-earth metals and Pb, and X is set so as to meet the relation $0.15 \leq X \leq 0.5$), pyrochlore-structure oxide $(Tl_{1-x}In_x)_2Mn_2O_7$ ($0 \leq X \leq 1$), layered-perovskite-structure oxide $(Ln_{1-x}A_x)_{n+1} Mn_nO_{3n+1}$ (Ln denotes at least one of the elements such as lanthanoid, Bi, and Y, A denotes at least one of alkali-earth metals and $\leq Pb$, and the relations $0.15 \leq X \leq 0.7$ and n=2.3 are set), spinel-structure oxide $Fe_3O_4$, and rutile-structure oxide $CrO_2$.

Moreover, the nonmagnetic conductive oxide constituting the intermediate layer uses at least one of the perovskite-structure oxides $SrMoO_3$, $SrIrO_3$, $La_{1-x}A_xRhO_3$ ($X \geq 0.3$), La-doped $SrTiO_3$ (doping value of 0.1 wt % or more), and Nb-doped $SrTiO_3$ (doping value of 0.05 wt % or more), and the rutile-structure oxides $RuO_2$ and $IrO_2$.

Furthermore, as described above, a magnetic sensor of the present invention has a structure in which the conductive intermediate layer (symbol 3 in FIG. 1) not easily reacting on an almost-completely-spin-polarized ferromagnetic metallic oxide and having a high lattice matching is held between two layers such as the spin injection layer (symbol 2 in FIG. 1) and the spin detection layer (symbol 4 in FIG. 1) respectively made of the ferromagnetic metallic oxide.

Therefore, the present invention provided with the above trilayer does not require the alignment necessary for the fabrication process of the prior art but it has an advantage that the plane size of an intermediate layer is only worked into submicron order through conventional photolithography and etching. Moreover, by using the above structure, spin-polarized carriers injected into an intermediate layer from a spin injection layer move in the film-thickness direction in the intermediate layer and therefore, it is possible to easily improve an output voltage only by decreasing the film thickness.

Moreover, a magnetic sensor of the present invention uses a nonmagnetic conductive oxide having a resistivity relatively larger than that of a single metal or alloy for an intermediate layer. Therefore, a large chemical potential difference is produced due to even a very small difference between the numbers of electrons of an up-spin band and a down-spin band in a paramagnetic metallic layer produced due to injection of spin-polarized carriers from a spin injection layer and consequently, a large output voltage can be obtained. Furthermore, because the intermediate layer uses a nonmagnetic conductive oxide not easily reacting with an almost-completely-spin-polarized ferromagnetic metal, no reactive layer is formed on the interface between the intermediate layer and the spin injection layer (or spin detection layer).

Furthermore, the intermediate layer of the present invention is closely lattice-matched to the spin injection layer and to the spin detection layer. Therefore, the intermediate layer and a spin injection layer (or spin detection layer) epitaxially grow and these layers do not form a grain boundary by being transformed into polycrystal.

Therefore, it is possible to prevent an output voltage from lowering due to the fact that spin of spin-polarized carriers flips on the interface or grain boundary between the spin injection layer (or spin detection layer) and the intermediate layer.

Furthermore, a nonmagnetic conductive oxide constituting an intermediate layer does not aggregate during the deposition of a trilayer because the oxide has a melting point higher than that of a single element such as Au or an alloy such as Au—Ge and a large adhesive strength with an almost-completely-spin-polarized ferromagnetic oxide such as $(La,Sr)MnO_3$. Therefore, it is possible to solve the conventional problem that the productivity of devices is lowered because separation or crack occurs on the interface between an intermediate layer and a spin injection layer (or spin detection layer).

DETAILED DESCRIPTION OF THE PREFERRED EMBODIMENTS

Embodiments of the present invention are described below by referring to FIGS. 1 to 4.

Embodiment (1)

Figure 1:
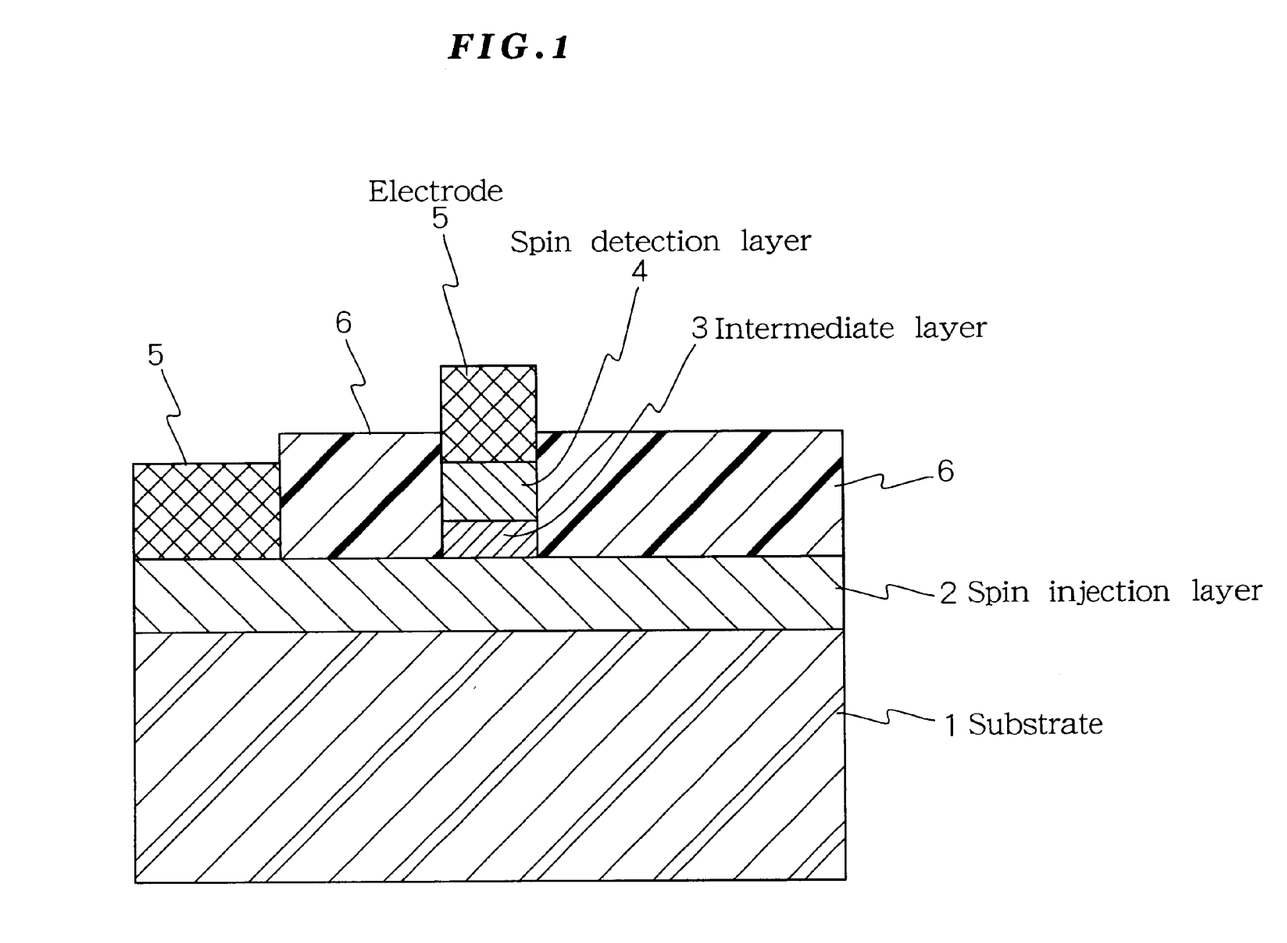
FIG. 1 is a schematic local sectional view showing an embodiment (1) of the present invention.

FIG. 1 shows the embodiment (1). In the first embodiment shown in FIG. 1, symbol 1 denotes a substrate. The substrate 1 functions so as to hold a device portion. A spin injection layer 2 formed on the substrate 1 and made of an almost-completely(highly)-spin-polarized ferromagnetic metal functions so as to inject spin-polarized carriers into an intermediate layer 3.

The intermediate layer 3 is held between the spin injection layer 2 and the spin detection layer 4 and functions so as to generate a voltage in accordance with the relative angle between magnetization directions of the spin injection layer 2 and spin detection layer 4 to be changed due to an external magnetic field and output the voltage to an external unit.

That is, when the magnetization direction of the spin injection layer 2 is parallel with that of the spin detection layer 4, carriers almost equal to the number of carriers injected into the intermediate layer 3 from the spin injection layer 2 are discharged from the intermediate layer 3 to the spin detection layer 4 and therefore, a potential difference hardly occurs between the spin injection layer 2 and the spin detection layer 4.

However, if the magnetization direction of the spin injection layer 2 is not parallel with that of the spin detection layer 4, the number of carriers injected into the intermediate layer 3 from the spin injection layer 2 becomes larger than the number of carriers to be discharged to the spin detection layer 4 from the intermediate layer 3. Therefore, a potential difference occurs between the spin injection layer 2 and the spin detection layer 4.

The spin detection layer 4 made of an almost-completely-spin-polarized ferromagnetic metal functions so as to receive spin-polarized carriers from the intermediate layer 3. Symbol 5 denotes an electrode. The electrode 5 functions so as to fetch the potential difference between the spin injection layer 2 and the spin detection layer 4. A layer insulating film 6 functions so as to prevent the spin injection layer 2 and spin detection layer 4 from being short-circuited.

Moreover, the layer insulating film 6 may operate the device concerned while fixing the spin of either of the spin injection layer 2 and spin detection layer 4 according to necessity. In this case, it is also possible to form a biasing layer (magnetism fixing layer) for biasing a magnetic field to fix a spin direction in contact with or nearby an (almost-completely-spin-polarized) ferromagnetic metal layer for fixing spin.

Furthermore, the spin injection layer 2 and spin detection layer 4 respectively uses any one of the perovskite-structure oxide $Ln_{1-x}A_xMnO_3$ (Ln denotes at least one of the elements such as lanthanoid, Bi, and Y, A denotes at least one of alkali-earth metals and Pb, and X is set so as to meet the relation $0.15 \leq X \leq 0.5$), pyrochlore-structure oxide $(Tl_{1-x}In_x)_2Mn_2O_7$ ($0 \leq X \leq 1$), layered-perovskite-structure-oxide $(Ln_{1-x}A_x)_{n+1}Mn_nO_{3n+1}$ (Ln denotes at least one of the elements such as lanthanoid, Bi, and Y, A denotes at least one of alkali-earth metals and Pb, and the relations $0.15 \leq X \leq 0.7$ and n=2.3 are set), spinel-structure oxide $Fe_3O_4$, and rutile-structure oxide $CrO_2$, which are almost-completely-spin-polarized ferromagnetic metallic oxide.

The intermediate layer 3 uses any one of the perovskite-structure oxides $SrMoO_3$, $SrIrO_3$, $La_{1-x}A_xRhO_3$ ($X \geq 0.3$), La-doped $SrTiO_3$ (doping value of 0.1 wt % or more), and Nb-doped $SrTiO_3$ (doping value of 0.05 wt % or more), and the rutile-structure oxides $RuO_2$ and $IrO_2$.

The substrate 1 uses anyone of a perovskite-structure oxide, rutile-structure oxide, spinel-structure oxide, layered-perovskite-structure oxide, and rock-salt-structure oxide. It is preferable to use the single crystal of the above oxides.

This is because a high-quality trilayer can be obtained because the spin injection layer 2, intermediate layer 3, and spin detection layer 4 grow as single crystal when forming an device on a single-crystal substrate.

The electrode 5 uses a nonmagnetic metal. Moreover, the layer insulating film 6 uses a nonmagnetic insulator.

More specifically, when the spin injection layer 2 uses any one of the perovskite-structure oxide $Ln_{1-x}A_xMnO_3$, pyrochlore-structure oxide $(Tl_{1-x}In_x)_2Mn_2O_7$, and layered-perovskite-structure oxide $(Ln_{1-x}A_x)_{n+1}Mn_nO_{3n+1}$, it is preferable to use a perovskite oxide or layered-perovskite-structure oxide for the substrate 1.

This is because the lattice matching between the substrate 1 and the spin injection layer 2 is preferable and moreover, a high-quality spin injection layer 2 is obtained.

Similarly, it is preferable to use a spinel-structure oxide or rock-salt-structure oxide for the substrate 1 when using the spinel-structure oxide $Fe_3O_4$ for the spin injection layer 2 and use a rutile-structure oxide for the substrate 1 when using the rutile-structure oxide $CrO_2$ for the spin injection layer 2.

Moreover, it is preferable to use any one of the perovskite-structure oxides $SrMoO_3$, $SrIrO_3$, $La_{1-x}A_xRhO_3$, La-doped $SrTiO_3$, and Nb-doped $SrTiO_3$ for the intermediate layer 3 when using any one of the perovskite-structure oxide $Ln_{1-x}A_xMnO_3$, pyrochlore-structure oxide $(Tl_{1-x}In_x)_2Mn_2O_7$, and layered-perovskite-structure oxide $(Ln_{1-x}A_x)_{n+1}Mn_nO_{3n+1}$, for the spin injection layer 2.

This is because the lattice matching between the intermediate layer 3 and the spin injection layer 2 is preferable and a high-quality intermediate layer 3 is obtained. Similarly, it is preferable to use either of the rutile-structure oxides $RuO_2$ and $IrO_2$ for the intermediate layer 3 when using the rutile-structure oxide $CrO_2$ for the spin injection layer 2.

Moreover, it is possible to use completely the same material or different materials for the spin injection layer 2 and the spin detection layer 4. However, it is preferable to use any one of the perovskite-structure oxide $Ln_{1-x}A_xMnO_3$, pyrochlore-structure oxide $(Tl_{1-x}In_x)_2Mn_2O_7$, and layered-perovskite-structure oxide $(Ln_{1-x}A_x)_{n+1}Mn_nO_{3n+1}$, for the spin detection layer 4 when using any one of the perovskite-structure oxides $SrMoO_3$, $SrIrO_3$, $La_{1-x}A_xRhO_3$, La-doped $SrTiO_3$, and Nb-doped $SrTiO_3$ for the intermediate layer 3.

This is because the lattice matching between the spin detection layer 4 and the intermediate layer 3 is preferable and a high-quality spin detection layer 4 is obtained.

Similarly, it is preferable to use the rutile-structure oxide $CrO_2$ when using either of the rutile-structure oxides $RuO_2$ and $IrO_2$ for the intermediate layer 3.

Then, a method for fabricating the device of this embodiment (1) is described below.

First, the substrate 1 is put in the vacuum chamber of a conventional pulse-laser deposition apparatus to exhaust the vacuum chamber up to $1*10^{-5}$ Torr or lower.

In this case, as a target to be ablated by a laser, ceramics having the same composition as the spin injection layer 2 is used to grow any one of the perovskite-structure oxide $Ln_{1-x}A_xMnO_3$, pyrochlore-structure oxide $(Tl_{1-x}In_x)_2Mn_2O_7$, and layered-perovskite-structure oxide $(Ln_{1-x}A_x)_{n+1}Mn_nO_{3n+1}$, as the spin injection layer 2, and use a pure metal of the device constituting the spin injection layer 2 to grow either of the spinel-structure oxide $Fe_3O_4$ and rutile-structure oxide $CrO_2$.

Then, the substrate 1 is heated up to a proper temperature.

In this case, it is preferable to set the substrate temperature in a range of 600 to 900 degrees centigrade to grow any one of the perovskite-structure oxide $Ln_{1-x}A_xMnO_3$, pyrochlore-structure oxide $(Tl_{1-x}In_x)_2Mn_2O_7$, layered-perovskite-structure oxide $(Ln_{1-x}A_x)_{n+1}Mn_nO_{3n+1}$, as the spin injection layer 2 and in a range of room temperature to 400 degrees centigrade to grow either of the spinel-structure oxide $Fe_3O_4$ and rutile-structure $CrO_2$.

This is because, out of the above ranges, an out-of-phase is deposited in the spin injection layer 2 or the substrate 1 reacts with the spin detection layer 1.

Moreover, oxygen is introduced into the vacuum chamber up to a proper pressure.

In this case, it is preferable to set the partial pressure of oxygen in a range of 1 to 500 mTorr to grow any one of the perovskite-structure oxide $Ln_{1-x}A_xMnO_3$, pyrochlore-structure oxide $(Tl_{1-x}In_x)_2Mn_2O_7$, and layered-perovskite-structure oxide $(Ln_{1-x}A_x)_{n+1}Mn_nO_{3n+1}$, as the spin injection layer 2 and in a range of $1*10^{-5}$ to $1*10^{-3}$ Torr to grow either of the spinel-structure oxide $Fe_3O_4$ and rutile-structure $CrO_2$.

This is because, out of the above ranges, an by-product is deposited in the spin injection layer 2 or oxygen deficiency or structural defect occurs in the spin injection layer 2.

Thereafter, a target is ablated by a laser to grow the spin injection layer 2 on the substrate 1 by a proper thickness. In this case, though the thickness of the spin injection layer 2 is not restricted, it is preferable to set the thickness to 50 nm or more.

This is because, as for a thickness less than the above value, the coercive force of the spin injection layer 2 becomes larger than the original value because of a strain due to the difference in lattice constant received by the spin injection layer 2 from the substrate and an device cannot detect a small magnetic field.

Then, the intermediate layer 3 is grown on the spin injection layer 2. In this case, a target to be ablated by a laser uses the ceramics having the same composition as the intermediate layer 3 or the pure metal of the device constituting the intermediate layer 3.

Moreover, it is preferable to set the substrate temperature and the partial pressure of oxygen to grow the intermediate layer 3 in ranges of 400 to 900 degrees centigrade and 500 mTorr or lower to grow any one of the perovskite-structure oxides $SrMoO_3$, $SrIrO_3$, $La_{1-x}A_xRhO_3$, La-doped $SrTiO_3$, and Nb-doped $SrTiO_3$ as the intermediate layer 3 and in ranges of room temperature to 400 degrees centigrade and 10 mTorr or lower to grow either of rutile-structure oxides $RuO_2$ and $IrO_2$ as the intermediate layer 3.

The reason is the same as the case of the spin injection layer 2.

Furthermore, though the thickness of the intermediate layer 3 is not restricted, it is preferable to set the thickness to 1 [Micro meter] or less. This is because, as for a thickness larger than the above value, spin-polarized carriers injected from the spin injection layer 2 flip in the intermediate layer 3 to lose the information for spin direction and the output voltage of an device lowers.

Furthermore, the spin detection layer 4 is grown on the intermediate layer 3 under the same condition as the case of the spin injection layer 2.

As for the above embodiment, a case is described in which pulse laser deposition is used to grow the spin injection layer 2, intermediate layer 3, and spin detection layer 4. However, it is also possible to use any one of sputtering, vacuum evaporation, and CVD.

However, pulse laser deposition is the most preferable among the above film forming methods. This is because the pulse laser deposition most easily realizes composition control.

Thereafter, the device is taken out of the vacuum chamber and the intermediate layer 3 and spin detection layer 4 are worked so that the spin injection layer 2 is exposed to the surface.

It is possible to use ion milling to work the intermediate layer 3 and spin detection layer 4 but the method is not restricted. Moreover, by finally forming and working the electrode 5, the device is completed.

It is possible to use either of sputtering and vacuum evaporation to form the electrode 5 but the method is not restricted. Moreover, it is possible to work the electrode 5 similarly to the intermediate layer 3 and spin detection layer 4.

EXAMPLES

Then, specific examples of the above embodiment (1) are described below more minutely.

First Example

First, the configuration of the first example is specifically described below by referring to FIG. 1.

As for the first example, a magnetic sensor is constituted of a spin injection layer 2 made of $La_{0.7}Sr_{0.3}MnO_3$ having a thickness of 100 nm, an intermediate layer 3 made of La-doped $SrTiO_3$ (doping value of 3.7 wt %) having a thickness of 10 nm held between the spin injection layer 2 and a spin detection layer 4, an electrode 5 made of Au having a thickness of 300 nm, and a layer insulating film 6 made of $SiO_2$ having a thickness of 500 nm, which are formed on a substrate 1 having a single-crystal $SrTiO_3$ (100) plane.

Then, the fabrication process is described below.

First, the single-crystal $SrTiO_3$ (100) substrate 1 whose surface is mirror-finished is put in the vacuum chamber of a conventional pulse-laser deposition apparatus to be evacuated to $1*10_{-6}$ Torr or lower. Then, the substrate 1 is heated up to 700 degrees centigrade . Moreover, oxygen is introduced into the vacuum chamber up to 500 mTorr.

Thereafter, a target is ablated by a KrF laser to grow a spin injection layer 2 made of $La_{0.7}Sr_{0.3}MnO_3$ on the substrate 1 up to a thickness of 100 nm. In this case, a target to be ablated by a laser uses ceramic of $La_{0.7}Sr_{0.3}MnO_3$.

Then, an intermediate layer 3 made of La-doped $SrTiO_3$ (doping value of 3.7 wt %) is grown on the spin injection layer 2 up to a thickness of 10 nm while keeping the same substrate temperature and introducing 1 mTorr of oxygen. In this case, a target to be ablated by a laser uses the ceramics of La-doped $SrTiO_3$ (doping value of 3.7 wt %).

Moreover, a spin detection layer 4 made of $La_{0.7}Sr_{0.3}MnO_3$ is grown on the intermediate layer 3 under the condition same as the case of the spin injection layer 2. Thereafter, the device is temporarily taken out of the vacuum chamber to respectively form the intermediate layer 3 and spin detection layer 4 into a rectangle of 2 [Micro meter] *10[Micro meter] through conventional photolithography and ion milling so that the spin injection layer 2 is exposed to the surface.

Then, a layer insulating film 6 made of $SiO_2$ is grown up to a thickness of 500 nm through sputtering before growing an electrode 5 to remove an $SiO_2$ film on the spin detection layer 4 through the lift-off method and then, an electrode 5 made of Au is grown up to a thickness of 300 nm through sputtering.

Finally, the electrode 5 is formed like a pad through conventional photolithography and ion milling.

As for the device thus fabricated, it was confirmed through X-ray diffraction and electron diffraction that the spin injection layer 2, intermediate layer 3, and spin detection layer 4 epitaxially grew on the substrate 1 and had a high crystallinity like single crystal.

Moreover, the magnetoresistance ratio when flowing a current of 1 [Micro ampere] through the device (rate of resistance change value due to external magnetic field to resistance in magnetic field) showed a large value of 130% in a weak external magnetic field of 50 Oe.

Furthermore, the yield of devices thus fabricated (rate of the number of normally-operating devices to the total number of fabricated devices) was 70% or more.

In this connection, when replacing the intermediate layer 3 with Au as a comparative example, the yield of devices was less than 5%. Moreover, in this case, the reluctance of a normally-operating device showed 70% at 50 Oe, which was a small value, compared to the case of this example.

Furthermore, it was confirmed through X-ray diffraction and electron diffraction that the intermediate layer 3 and spin detection layer 4 of a normally-operating device were respectively constituted of a polycrytalline body.

Second Example

Then, the configuration of the second example is specifically described below by referring to FIG. 1 similarly to the case of the above-described Example 1.

First, the magnetic sensor of the second example is constituted of a spin injection layer 2, made of $Nd_{0.7}Sr_{0.3}MnO_3$ having a thickness of 100 nm, an intermediate layer 3 made of $SrMoO_3$ having a thickness of 10 nm held between the spin injection layer 2 and a spin detection layer 4, an electrode 5 made of Au having a thickness of 300 nm, and a layer insulating film 6 made of $Sio_2$ having a thickness of 500 nm, which are formed on a substrate 1 having a single-crystal $NdGaO_3$ (100) plane.

Then, a method for fabricating the magnetic sensor of the second example is described below.

First, the single-crystal $NdGaO_3$ (100) substrate 1 whose surface is mirror-finished is put in the vacuum chamber of a conventional pulse-laser deposition apparatus to be evacuated up to $1*10^{-6}$ Torr or lower.

Then, the substrate 1 is heated up to 700 degrees centigrade. Moreover, oxygen is introduced into the vacuum chamber up to 500 mTorr. Thereafter, a target is ablated by a KrF laser to grow a spin injection layer 2 made of $Nd_{0.7}Sr_{0.3}MnO_3$ up to a thickness of 100 nm on the substrate 1.

In this case, a target to be ablated by the laser uses ceramics of $Nd_{0.7}Sr_{0.3}MnO_3$. Moreover, while keeping the same substrate temperature and evacuating the vacuum chamber up to $1*10^{-4}$ Torr or lower, an intermediate layer 3 made of $SrMoO_3$ is grown on the spin injection layer 2 up to a thickness of 20 nm. A target to be ablated by a laser uses ceramics of $SrMoO_3$.

Moreover, a spin detection layer 4 made of $Nd_{0.7}Sr_{0.3}MnO_3$ is grown on the intermediate layer 3 under the condition same as the case of the spin injection layer 2. Thereafter, the device is temporarily taken out of the vacuum chamber to respectively form the intermediate layer 3 and spin detection layer 4 into a rectangle of 2 [Micro meter] *10[Micro meter] through conventional photolithography and ion milling so that the spin injection layer 2 is exposed to the surface.

Then, a layer insulating film 6 made of $SiO_2$ is grown up to a thickness of 500 nm through sputtering before growing an electrode 5 to remove an $SiO_2$ film from the surface of the spin detection layer 4 through the lift-off method and thereafter, the electrode 5 made of Au is grown up to a thickness of 300 nm through sputtering. Finally, the electrode 5 is formed like a pad through conventional photolithography and ion milling.

As for the device thus fabricated, it was confirmed through X-ray diffraction and electron diffraction that the spin injection layer 2, intermediate layer 3, and spin detection layer 4 epitaxially grew on the substrate 1 and had a high crystallinity like single crystal.

Moreover, the magnetoresistance ratio of the device showed a large value of 120% at 50 Oe. Furthermore, the yield of devices thus fabricated was 75% or more.

Example 3

Then, the third example is specifically described below by referring to FIG. 1 similarly to the case of the above Example 1.

First, the magnetic sensor of the third example is constituted of a spin injection layer 2 made of $(La_{0.4}Ca_{0.6})_3Mn_2O_7$ having a thickness of 200 nm, an intermediate layer 3 made of $SrIrO_3$ having a thickness of 50 nm held between the spin injection layer 2 and a spin detection layer 4, an electrode 5 made of Au having a thickness of 300 nm, and a layer insulating film 6 made of $SiO_2$ having a thickness of 500 nm, which are formed on a substrate 1 having a single-crystal $LaAlO_3$ (100) plane.

Then, a method for fabricating the magnetic sensor of the Example 3 is described below.

First, a single-crystal $LaAlO_3$ (100) substrate 1 whose surface is mirror-finished is put in the vacuum chamber of a conventional pulse-laser deposition apparatus to be evacuated up to $1*10^{-6}$ Torr or lower.

Then, the substrate 1 is heated up to 800 degrees centigrade. Moreover, oxygen is introduced into the vacuum chamber up to 400 mTorr. Thereafter, a target is ablated by a KrF laser to grow a spin injection layer 2 made of $(La_{0.4}Ca_{0.6})_3Mn_2O_7$ on the substrate 1 up to a thickness of 200 nm.

In this case, a target to be ablated by a laser uses ceramics of $(La_{0.4}Ca_{0.6})_3Mn_2O_7$. Then, while keeping the same substrate temperature and the partial pressure of oxygen, an intermediate layer 3 made of $SrIrO_3$ is grown on the spin injection layer 2 up to a thickness of 50 nm. A target to be ablated by a laser uses ceramics of $SrIrO_3$.

Moreover, a spin detection layer 4 made of $(La_{0.4}Ca_{0.6})_3Mn_2O_7$ is grown on the intermediate layer 3 under the condition same as the case of the spin injection layer 2. Thereafter, the device is temporarily taken out of the vacuum chamber and moreover, the intermediate layer 3 and spin detection layer 4 are respectively formed into a rectangle of 5 [Micro meter]*20[Micro meter] through conventional photolithography and ion milling so that the spin injection layer 2 is exposed to the surface.

Then, a layer insulating film 6 made of $SiO_2$ is grown up to a thickness of 500 nm through sputtering before growing an electrode 5 to remove an $SiO_2$ film from the surface of the spin detection layer 4 through the lift-off method and then, the electrode 5 made of Au is grown through sputtering up to a thickness of 300 nm. Finally, the electrode 5 is formed like a pad through conventional photolithography and ion milling.

As for the device thus fabricated, it was confirmed through X-ray diffraction and electron diffraction that the spin injection layer 2, intermediate layer 3, and spin detection layer 4 epitaxially grew on the substrate 1 and had a high crystallinity like single crystal. Moreover, the magnetoresistance ratio of the device showed a large value of 135% at 50 Oe. Furthermore, the yield of devices thus fabricated was 65% or more.

Fourth Example

The configuration of the fourth example is specifically described below by referring to FIG. 1 similarly to the previously-described Example 1.

First, the magnetic sensor of the fourth example is constituted of a spin injection layer 1 made of $Fe_3O_4$ having a thickness of 100 nm, an intermediate layer 3 made of Nb-doped $SrTiO_3$ (doping value of 1.0 wt %) having a thickness of 10 nm held between the spin injection layer 1 and a spin detection layer 4, an electrode 5 made of Pt having a thickness of 300 nm, and a layer insulating film 6 made of $Al_2O_3$ having a thickness of 500 nm, which are formed on a substrate 1 having a single-crystal MgO (100) plane.

Then, a method for fabricating the magnetic sensor of the fourth example is described below.

First, a single-crystal MgO (100) substrate 1 whose surface is mirror-finished is put in the vacuum chamber of a conventional pulse-laser deposition apparatus to be evacuated up to $1*10^{-6}$ Torr or lower.

Then, the substrate 1 is heated up to 400 degrees centigrade. Moreover, oxygen is introduced into the vacuum chamber up to $1*10^{-5}$ Torr. Thereafter, a target is ablated by a KrF laser to grow a spin injection layer 2 made of $Fe_3O_4$ on the substrate 1 up to a thickness of 100 nm.

In this case, a target to be ablated by a laser uses a metal Fe.

Then, while keeping the same substrate temperature and the partial pressure of oxygen, an intermediate layer 3 made of Nb-doped $SrTiO_3$ (doping value of 1.0 wt %) is grown on the spin injection layer 2 up to a thickness of 10 nm. In this case, a target to be ablated by a laser uses ceramics of Nb-doped $SrTiO_3$ (doping value of 1.0 wt %).

Moreover, a spin detection layer 4 made of $Fe_3O_4$ is grown on the intermediate layer 3 under the same condition as the case of the spin injection layer 2. Thereafter, the device is temporarily taken out of the vacuum chamber to respectively form the intermediate layer 3 and spin detection layer 4 into a rectangle of 2 [Micro meter]*10[Micro meter] through conventional photolithography and ion milling so that the spin injection layer 2 is exposed to the surface.

Then, a layer insulating film 6 made of $Al_2O_3$ is grown through sputtering up to a thickness of 500 nm before growing an electrode 5 to remove an $Al_2O_3$ film from the surface of the spin detection layer 4 through the lift-off method and then, the electrode 5 made of Pt is grown up to a thickness of 300 nm. Finally, the electrode 5 is formed like a pad through conventional photolithography and ion milling.

As for the device thus fabricated, it was confirmed through X-ray diffraction and electron diffraction that the spin injection layer 2, intermediate layer 3, and spin detection layer 4 epitaxially grew on the substrate 1 and had a high crystallinity like single crystal. Moreover, the magnetoresistance ratio of the device showed a high value of 120% at 50 Oe. Furthermore, the yield of devices thus fabricated was 65% or more.

Fifth Example

Then, the configuration of the fifth example is specifically described below by referring to FIG. 1 similarly to the case of the previously-described Example 1.

First, the magnetic sensor of the fifth Example is constituted of a spin injection layer 2 made of $CrO_2$ having a thickness of 500 nm, an intermediate layer 3 made of $IrO_2$ having a thickness of 10 nm held between the spin injection layer 2 and a spin detection layer 4, an electrode 5 made of Pt having a thickness of 300 nm, and a layer insulating film 6 made of $Al_2O_3$ having a thickness of 500 nm, which are formed on a substrate 1 having a single-crystal $TiO_2$ (100) plane.

Then, a method for fabricating the magnetic sensor of the fifth example is described below.

First, a single-crystal $TiO_2$ (100) substrate 1 whose surface is mirror-finished is put in the vacuum chamber of a conventional pulse-laser deposition apparatus to exhaust the vacuum chamber up to $1*10^{-6}$ Torr or lower. Then, the substrate 1 is heated up to 400 degrees centigrade. Moreover, oxygen is introduced into the vacuum chamber up to $1*10^{-3}$ Torr.

Thereafter, a target is ablated by a KrF laser to grow a spin injection layer 2 made of $CrO_2$ on the substrate 1 up to a thickness of 100 nm.

In this case, a target to be ablated by a laser uses a metal Cr. Then, while keeping the same substrate temperature and the partial pressure of oxygen, an intermediate layer 3 made of $IrO_2$ is grown on the spin injection layer 2 up to a thickness of 10nm. In this case, a target to be ablated by a laser uses a metal Ir.

Moreover, a spin detection layer 4 made of $CrO_2$ is grown on the intermediate layer 3 under the same condition as the case of the spin injection layer 2. Thereafter, the device is temporarily taken out of the vacuum chamber to respectively form the intermediate layer 3 and spin detection layer 4 into a rectangle of 10 [Micro meter]*50[Micro meter] through conventional photolithography and ion milling so that the spin injection layer 2 is exposed to the surface.

Then, a layer insulating film 6 made of $Al_2O_3$ is grown through sputtering up to a thickness of 500 nm before growing an electrode 5 to remove an $Al_2O_3$ film from the surface of the spin detection layer 4 through the lift-off method and then, the electrode 5 made of Pt is grown up to a thickness of 300 nm through sputtering. Finally, the electrode 5 is formed like a pad through conventional photolithography and ion milling.

As for the device thus fabricated, it was confirmed through X-ray diffraction and electron diffraction that the spin injection layer 2, intermediate layer 3, and spin detection layer 4 epitaxially grew on the substrate 1 and had a high crystallinity like single crystal. Moreover, the magnetoresistance ratio of the device showed a high value of 11% at 50 Oe. Furthermore, the yield of devices thus fabricated was 60% or more.

Embodiment (2)

Figure 2:
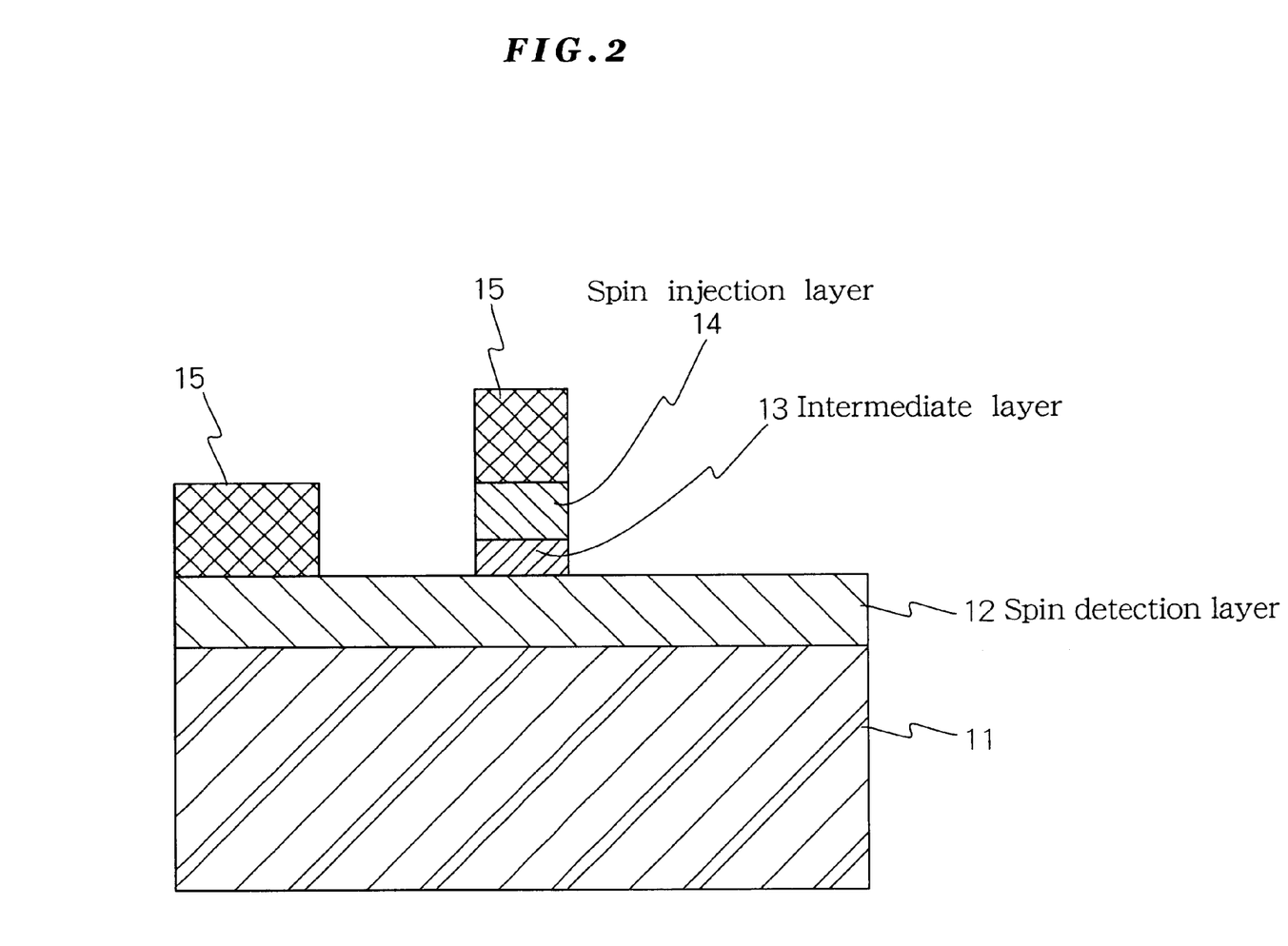
FIG. 2 is a schematic local sectional view showing an embodiment (2) of the present invention.

FIG. 2 shows embodiment (2). In FIG. 2, symbol 11 denotes a substrate. The substrate 11 functions so as to support a magnetic sensor. A spin detection layer 12 made of an almost-completely (highly)-spin-polarized ferromagnetic metal formed on the substrate 11 functions so as to receive spin-polarized carriers from an intermediate layer 13.

The intermediate layer 13 is held between the spin detection layer 12 and a spin injection layer 14 and functions so as to generate a predetermined voltage in accordance with the relative angle between magnetization directions of the spin detection layer 12 and spin injection layer 14 to be changed due to an external magnetic field. The voltage generation mechanism is the same as that described for FIG. 1.

The spin injection layer 14 made of an almost-completely-spin-polarized ferromagnetic metal functions so as to inject spin-polarized carriers into the intermediate layer 13. Symbol 15 denotes an electrode. The electrode 15 functions so as to fetch the potential difference between the spin detection layer 12 and the spin injection layer 14. Thus, a spin injection layer 14 and a spin detection layer 12 can be faced each other at the both sides of an intermediate layer and the vertical positional relation between the layers is not a problem.

Other configuration is the same as that of the above example of FIG. 1.

Thus, it is possible to obtain a magnetic sensor having functions and advantages almost the same as those of the above first example shown in FIG. 1.

Embodiment (3)

Figure 3:
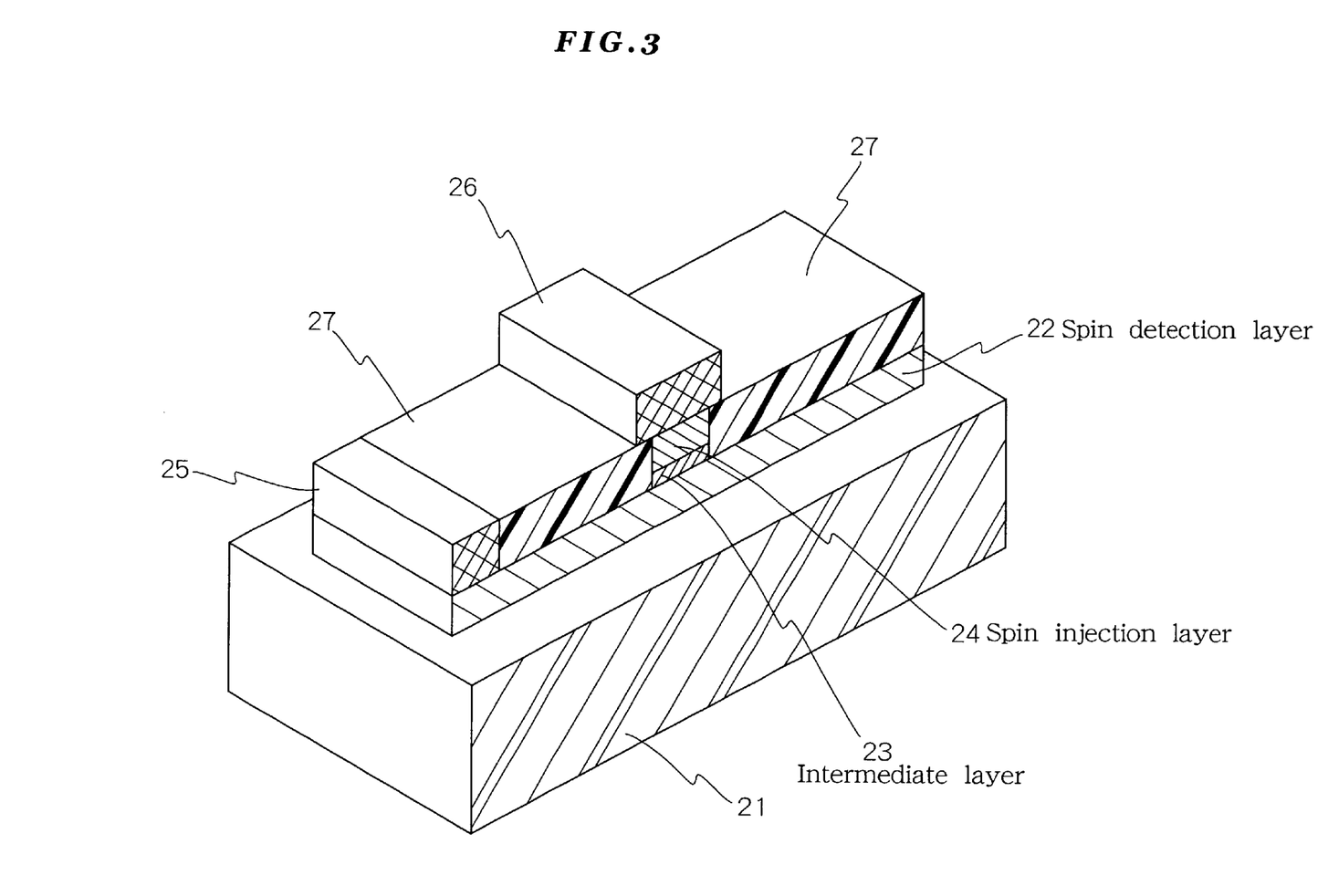
FIG. 3 is a schematic local sectional view showing an embodiment (3) of the present invention.

FIG. 3 shows embodiment (3). In FIG. 3, symbol 21 denotes a substrate. The substrate 21 functions so as to support a magnetic sensor. A spin detection layer 22 made of an almost-completely (highly)-spin-polarized ferromagnetic metal is formed on the substrate 21 and patterned.

The spin detection layer 22 functions so as to receive spin-polarized carriers from an intermediate layer 23. The intermediate layer 23 is held between the spin detection layer 22 and a spin injection layer 24 and functions so as to generate a predetermined voltage in accordance with the relative angle between the magnetization directions of the spin detection layer 22 and the spin injection layer 24 to be changed due to an external magnetic field. The voltage generation mechanism is the same as each of those described for FIGS. 1 and 2.

In FIG. 3, a spin injection layer 24 made of almost-completely-spin-polarized ferromagnetic metal formed on the intermediate layer 23 functions so as to inject spin-polarized carrier into the intermediate layer 23. A bottom electrode 25 and a top electrode 26 function so as to fetch the potential difference between the spin detection layer 22 and the spin injection layer 24. Moreover, a layer insulating film 27 functions so as to prevent the top electrode 26 and the spin detection layer 22 from being short-circuited.

Thus, it is possible to obtain a magnetic sensor having functions and advantages almost same as those of the first example shown in FIG. 1.

In this case, when the spin injection layer 24 and the spin detection layer 22 are faced each other at the both sides of the intermediate layer 23, it is possible to respectively form the layers the spin injection layer 24, the spin detection layer 22 and the intermediate layer 23 into a shape corresponding to necessity. It is preferable to form the intermediate layer 23 into a small shape.

This is because, when current is constant, the volume of an intermediate layer decreases, the density of spin-polarized carriers increases, and nonequilibrium static magnetization increases and resultantly, it is possible to raise an output voltage.

Moreover, it is possible to replace the spin detection layer 22 with the spin injection layer 24 each other.

Embodiment (4)

Figure 4:
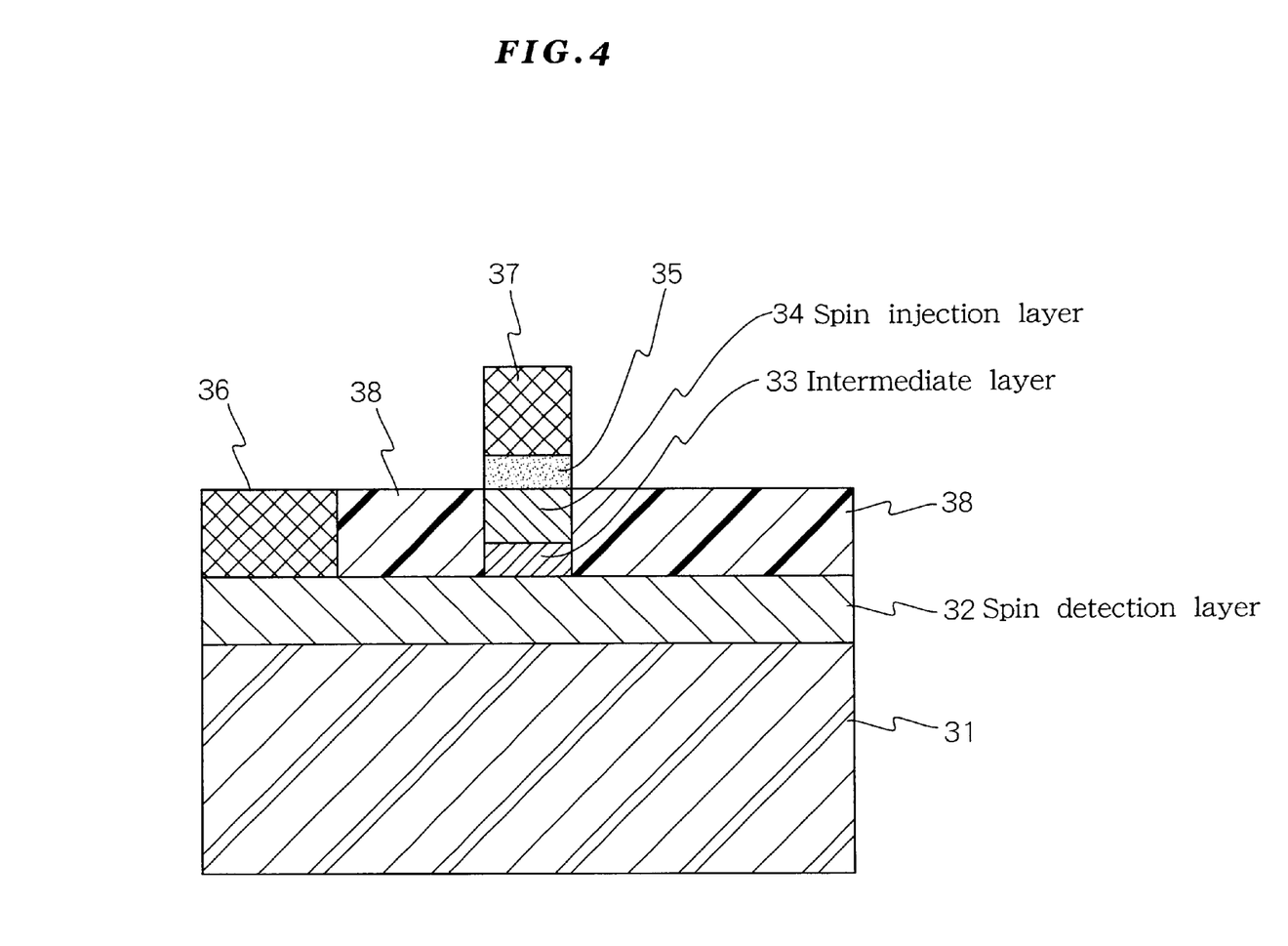
FIG. 4 is a schematic local sectional view showing an embodiment (4) of the present invention.

FIG. 4 shows embodiment (4). In FIG. 4, symbol 31 denotes a substrate. The substrate 31 functions so as to support a magnetic sensor. A spin detection layer 32 made of an almost-completely (highly)-spin-polarized ferromagnetic metal formed on the substrate 31 functions so as to receive spin-polarized carriers from an intermediate layer 33.

The intermediate layer 33 is held between the spin detection layer 32 and a spin injection layer 34 and functions so as to generate a voltage in accordance with the relative angle between the magnetization direction of the spin detection layer 32 to be changed due to an external magnetic field and the magnetization direction of the spin injection layer 34 fixed by a magnetic bias layer 35. In this case, the voltage generation mechanism is the same as each of those described for FIGS. 1 to 3.

The spin injection layer 34 made of an almost-completely-spin-polarized ferromagnetic material formed into the same shape as the intermediate layer 33 functions so as to inject spin-polarized carriers into the intermediate layer 33. The bias layer 35 functions so as to fix the magnetization direction of the spin injection layer 34.

A bottom electrode 36 and a top electrode 37 function so as to fetch the potential difference between the spin detection layer 32 and the spin injection layer 34. A layer insulating film 38 functions so as to prevent the top electrode 37 and spin detection layer 32 from being short-circuited. It is possible to replace the spin detection layer 32 with the spin injection layer 34.

Thus, it is also possible to form a bias layer for fixing magnetization on either of the spin detection layer 32 and spin injection layer 34. The top electrode 37 can be directly connected to an almost-completely-spin-polarized ferromagnetic metal layer not through the bias layer 35.

Actually, the bias layer 35 uses an antiferromagnetic material. In this case, it is preferable to use an antiferromagnetic material oxide. This is because the magnetization direction of the spin injection layer 34 is more strongly fixed due to the magnetic interaction through oxygen ions on the interface between the spin injection layer 34 and the bias layer 35.

Thus, it is possible to obtain a magnetic sensor having the functions and advantages almost same as those of the first example shown in FIG. 1.

It is the first advantage that a large reluctance can be obtained from a weak magnetic field.

This is because an intermediate layer uses a nonmagnetic conductive oxide having a relative large resistivity compared to that of a single metal or an alloy and thereby, a large chemical potential difference is produced even due to a very small difference between the numbers of electrons of an up-spin band and a down-spin band in a paramagnetic metal layer formed due to injection of spin-polarized carriers from a spin injection layer, and resultantly a large output voltage can be obtained. Moreover, because an intermediate layer uses a nonmagnetic conductive oxide not easily reacting with an almost-completely-spin-polarized ferromagnetic metal, no reactive layer is produced on the interface between the intermediate layer and a spin injection layer (or spin detection layer). Furthermore, because an intermediate layer uses a nonmagnetic conductive oxide having a preferable lattice matching with an almost-completely-spin-polarized ferromagnetic metal, an intermediate layer and a spin injection layer (or spin detection layer) epitaxially grow and thus, these layers do not produce any grain boundary by being transformed into polycrystal. Therefore, it is possible to prevent an output voltage from lowering due to the fact that the spin of spin-polarized carriers flips on the interface or grain boundary.

It is the second advantage that the reliability and productivity of devices can be improved. This is because an intermediate layer uses a nonmagnetic conductive oxide not easily reacting with an almost-completely-spin-polarized ferromagnetic metal, thereby no reactive layer is formed on the interface between the intermediate layer and a spin injection layer (or spin detection layer), moreover the nonmagnetic conductive oxide has a melting point higher than that of a single element such as Au or an alloy of Au—Ge and has a large adhesive strength with the almost-completely-spin-polarized ferromagnetic metal such as (La, Sr) $MnO_3$ but the nonmagnetic conductive oxide does not cohesion during the deposition of a trilayer, and thus it is possible to prevent a device from being broken due to separation or crack caused on the interface between the spin injection layer (or spin detection layer) and the intermediate layer.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-185033 (Filed on Jun. 30, 1998) including specification, claims, drawings and summary are incorporated herein by reference in its entirety.

What is claimed is:

1. A magnetic sensor comprising:
a spin injection layer and a spin detection layer respectively constituted of a spin-polarized oxide ferromagnetic material; and
an intermediate layer constituted of a nonmagnetic conductive oxide held between the spin injection layer and the spin detection layer,
wherein the intermediate layer directly contacts, and lattice matches, the spin injection layer and the spin detection layer, free of any reactive layer therebetween.

2. The magnetic sensor according to claim 1, wherein at least one of the oxide ferromagnetic materials of the spin injection layer and the spin detection layer use a perovskite-structure oxide.

3. The magnetic sensor according to claim 1, wherein at least one of the oxide ferromagnetic materials of the spin injection layer and the spin detection layer uses $Ln_{1-x}A_xMnO_3$, Ln denotes at least one of the elements such as lanthanoid, Bi, and Y, A denotes at least one of alkali-earth metals and Pb, and $0.15 \leq X \leq 0.5$.

4. The magnetic sensor according to claim 1, wherein at least one of the oxide ferromagnetic materials of the spin injection layer and the spin detection layer uses a pyrochlore-structure oxide.

5. The magnetic sensor according to claim 1, wherein at least one of the oxide ferromagnetic materials of the spin injection layer and the spin detection layer uses $(Tl_{1-x}In_x)_2Mn_2O_7$ $(0 \leq X \leq 1)$.

6. The magnetic sensor according to claim 1, wherein at least one of the oxide ferromagnetic materials of the spin injection layer and the spin detection layer uses a layered-perovskite-structure oxide.

7. The magnetic sensor according to claim 1, wherein at least one of the oxide ferromagnetic materials of the spin injection layer and the spin detection layer uses $(Ln_{1-x}A_x)_{n+1} Mn_nO_{3n+1}$, Ln denotes at least one of the elements such as lanthanoid, Bi, and Y, A denotes at least one of alkali-earth metals and Pb, and $0.15 \leq X \leq 0.7$, n=2.3.

8. The magnetic sensor according to claim 1, wherein at least one of the oxide ferromagnetic materials of the spin injection layer and the spin detection layer uses a spinel-structure oxide.

9. The magnetic sensor according to claim 1, wherein at least one of the oxide ferromagnetic materials of the spin injection layer and the spin detection layer uses $Fe_3O_4$.

10. The magnetic sensor according to claim 1, wherein at least one of the oxide ferromagnetic materials of the spin injection layer and the spin detection layer uses a rutile-structure oxide.

11. The magnetic sensor according to claim 1, wherein at least one of the oxide ferromagnetic materials of the spin injection layer and the spin detection layer uses $CrO_2$.

12. The magnetic sensor according to claim 1, wherein the nonmagnetic conductive oxide constituting the intermediate layer uses a perovskite-structure oxide.

13. The magnetic sensor according to claim 12, wherein the nonmagnetic conductive oxide constituting the intermediate layer uses a perovskite-structure oxide $SrMoO_3$.

14. The magnetic sensor according to claim 12, wherein the nonmagnetic conductive oxide constituting the intermediate layer uses a perovskite-structure oxide $SrIrO_3$.

15. The magnetic sensor according to claim 12, wherein the nonmagnetic conductive oxide constituting the intermediate layer uses a perovskite-structure oxide $La_{1-x}A_xRhO_3$ $(X \leq 0.3)$.

16. The magnetic sensor according to claim 12, wherein the nonmagnetic conductive oxide constituting the intermediate layer uses a perovskite-structure oxide La-doped $SrTiO_3$ (doping value of 0.1 wt % or more).

17. The magnetic sensor according to claim 12, wherein the nonmagnetic conductive oxide constituting the intermediate layer uses a perovskite-structure oxide Nb-doped $SrTiO_3$ (doping value of 0.05 wt % or more).

18. The magnetic sensor according to claim 1, wherein the nonmagnetic conductive oxide constituting the intermediate layer uses a rutile-structure oxide.

19. The magnetic sensor according to claim 18, wherein the nonmagnetic conductive oxide constituting the intermediate layer uses a rutile-structure oxide $RuO_2$.

20. The magnetic sensor according to claim 18, wherein the nonmagnetic conductive oxide constituting the intermediate layer uses a rutile-structure oxide $IrO_2$.

* * * * *